United States Patent [19]
Huang et al.

[11] Patent Number: 5,624,010
[45] Date of Patent: Apr. 29, 1997

[54] REGULABLE SHOCK-ABSORPTION VALVE SYSTEM FOR THE DASHPOT IN A MOTOR VEHICLE

[75] Inventors: Zhen Huang, Wuppertal; Klaus Schmidt, Bergisch Gladbach; Hans Scheerer, Esslingen; Andreas Opara, Fellbach, all of Germany

[73] Assignees: August Bilstein GmbH & Co., Ennepetal; Mercedez-Benz, Stuttgart, both of Germany

[21] Appl. No.: 351,501

[22] Filed: Dec. 7, 1994

[30] Foreign Application Priority Data

Dec. 8, 1993 [DE] Germany .................. 43 41 775.2

[51] Int. Cl.$^6$ .............................. F16F 9/46; B60G 17/08
[52] U.S. Cl. ...................... 188/299; 188/322.13
[58] Field of Search .................... 188/299, 318, 188/322.13, 298, 316, 313, 314, 315, 322.15, 281, 282, 280, 311; 280/707, 714

[56] References Cited

U.S. PATENT DOCUMENTS 4,960,188  10/1990  Wössner ........................ 188/299
5,375,683  12/1994  Huang et al. .................. 188/299
5,540,309   7/1996  Huang et al. .................. 188/299

*Primary Examiner*—Douglas C. Butler
*Attorney, Agent, or Firm*—Max Fogiel

[57] ABSTRACT

The invention concerns a regulable shock-absorption valve system for the dashpot in a motor vehicle. It has two shock-absorption valves. Each valve consists of an electromagnetic bolt that slides back and forth and operates in conjunction with at least one port and of a pressure-sensitive valve for the suction stage and for the compression stage, mutually coaxially accommodated in an essentially cylindrical housing and capable of communicating by way of hydraulic-fluid channels. The pressure-sensitive valves (7 & 8) in accordance with the present invention rest on a simple or complex component (15) with its ends permanently or temporarily secured in a bore that extends through the center of the pole cores (17 & 18) of the electromagnets (11) that actuate the bolts (5 & 6). The advantages of the present invention are direct transmission of the shock-absorption forces and simpler assembly of the system.

8 Claims, 2 Drawing Sheets

REGULABLE SHOCK-ABSORPTION VALVE SYSTEM FOR THE DASHPOT IN A MOTOR VEHICLE

BACKGROUND OF THE INVENTION

The present invention concerns a regulable shock-absorption valve system for the dashpot in a motor vehicle. The system comprises two shock-absorption valves. Each consists of an electromagnetic bolt that operates in conjunction with at least one port and with a pressure- sensitive valve for the suction stage and compression stage. The shock-absorption valves are accommodated coaxial in an essentially cylindrical housing and can communicate through hydraulic-fluid channels.

A valve housing of this genus is described in German 4 216 987 A1. The coaxially accommodated valves for the suction and compression stages in the known system rest along with their bodies on a simple or complex component. The valves are mutually secured by nuts on the ends of the component the valves are mounted on. One of the nuts simultaneously secures the assembly to a support. The support rests in turn on the housing of one of the bolts. Any forces that occur inside the valve are accordingly transmitted to the housing.

SUMMARY OF THE INVENTION

The object of the present invention is a system of shock-absorption valves for regulating the shock-absorption force in a dashpot whereby any forces that occur inside a valve will be transmitted directly to the valve housing and diverted from the bolt housing.

This object is attained in accordance with the present invention by the characteristics recited in the body of the claims. The subsidiary claims recite advantageous embodiments of the system in accordance with the present invention.

The simple or complex component that the pressure-sensitive valves rest on are secured with its ends permanently or temporarily in a bore through the center of the pole cores of the electromagnets that actuate the bolts.

The ends of the component in one advantageous embodiment screw into the bore.

The ends of the component that the pressure-sensitive valves rest on in another embodiment of the system extend through the bore through the center of the pole cores and are secured outside the system.

The advantages of the present invention are direct transmission of the shock-absorption forces and simpler assembly of the system.

BRIEF DESCRIPTION OF THE DRAWINGS

Several embodiments of the invention will now be described with reference to the accompanying drawing, wherein.

DESCRIPTION OF THE PREFERRED EMBODIMENTS

Figure 1:
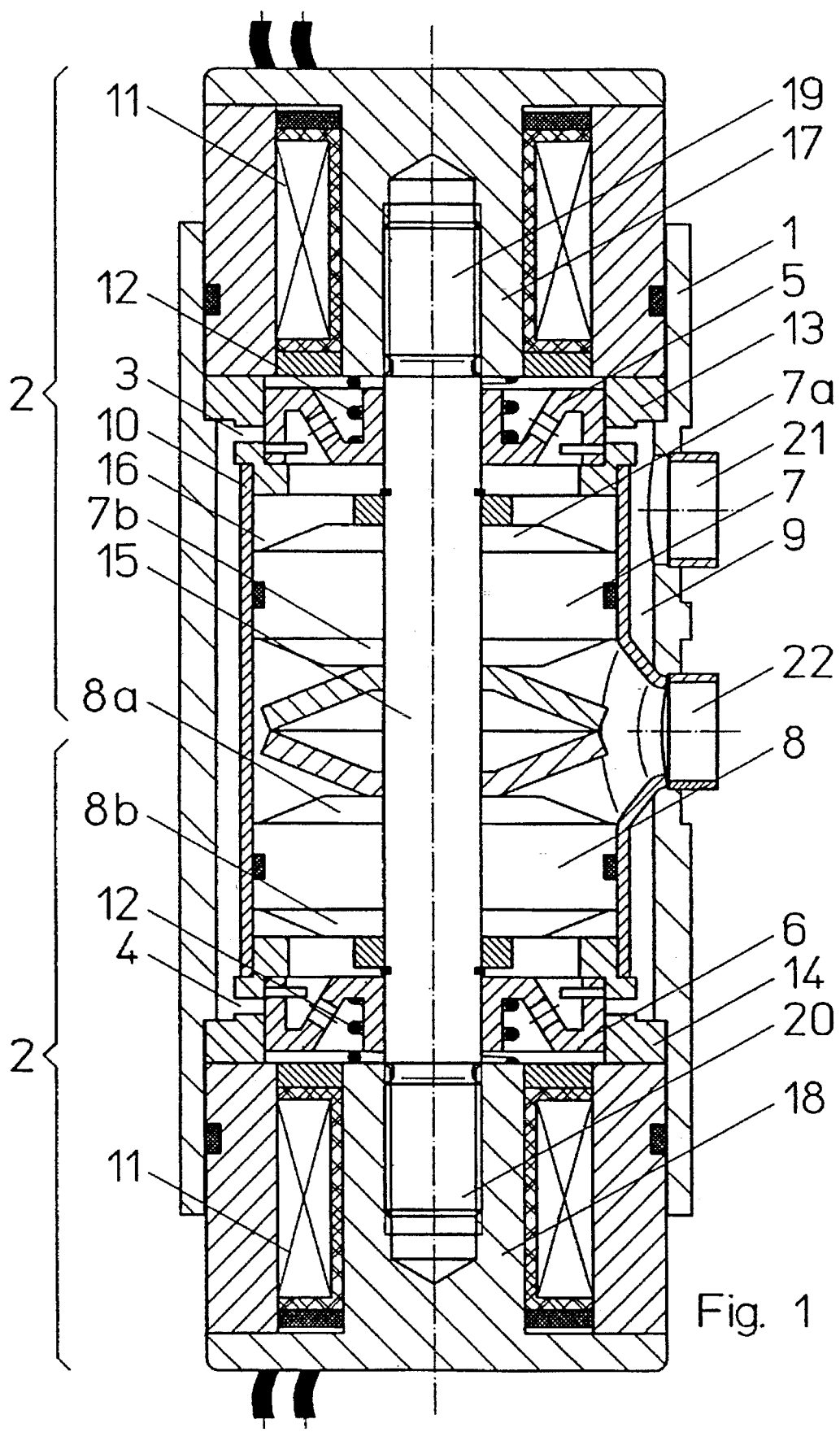
FIG. 1 is an illustration of the valve system whereby the pressure-sensitive valves are in series with the electromagnetic valves and FIG. 2 is an illustration of the system whereby the pressure-sensitive valves parallel the electromagnet valves.

The system illustrated in FIG. 1 comprises a cylindrical valve housing 1 accommodating two coaxial shock-absorption performance-curve selection valves 2. Each curve-selection valve 2 accommodates an electromagnetic bolt 5 and 6 and a pressure-sensitive valve 7 and 8. Bolt 5 is accommodated in a housing 13 and operates in conjunction with a port 3. Bolt 6 is accommodated in a housing 14 and operates in conjunction with a port 4. Pressure-sensitive valve 7 accommodates spring-loaded bolts 7a and 7b that slide toward and away from each other upstream and downstream and open and close the valve more or less in accordance with the pressure of the shock-absorbing fluid. Pressure-sensitive valve 8 accommodates spring-loaded bolts 8a and 8b that slide toward and away from each other upstream and downstream and open and close the valve more or less in accordance with the pressure of the shock-absorbing fluid. Each bore 5 and 6 is actuated by an electromagnet 11 and maintained closed by a spring 12.

The hydraulic-fluid channel 9 between the ports 3 and 4 opened and closed by bolts 5 and 6 extends between the outer surface of a cylinder 10 accommodated in valve housing 1 and the inner surface of the housing. Cylinder 10 simultaneously constitutes in conjunction with the housings 13 and 14 that accommodate bolts 5 and 6 the interior 16 of the valve. Interior 16 accommodates the pressure-sensitive valves 7 and 8 that are secured inside housing 1 by resting on component 15. The ends 19 and 20 of the component 15 in this component have an external thread and screw into a bore that extends through the center of the pole cores 17 and 18 of electromagnet 11. Bolts 5 and 6 are accordingly rings of magnetic material. Bolt housings 13 and 14 are of non-magnetic material to ensure a magnetic circuit.

The hydraulic-fluid connections 21 and 22 positioned outside on the dashpot or level control are positioned radially on valve housing 1 to ensure that hydraulic-fluid connection 21 communicates with hydraulic-fluid channel 9 and hydraulic-fluid connection 22 axially with pressure-sensitive valves 7 and 8 and interior 16. This distribution of the hydraulic-fluid connections provides series communication between pressure-sensitive valves 7 and 8 and electromagnetic bolts 5 and 6.

Figure 2:
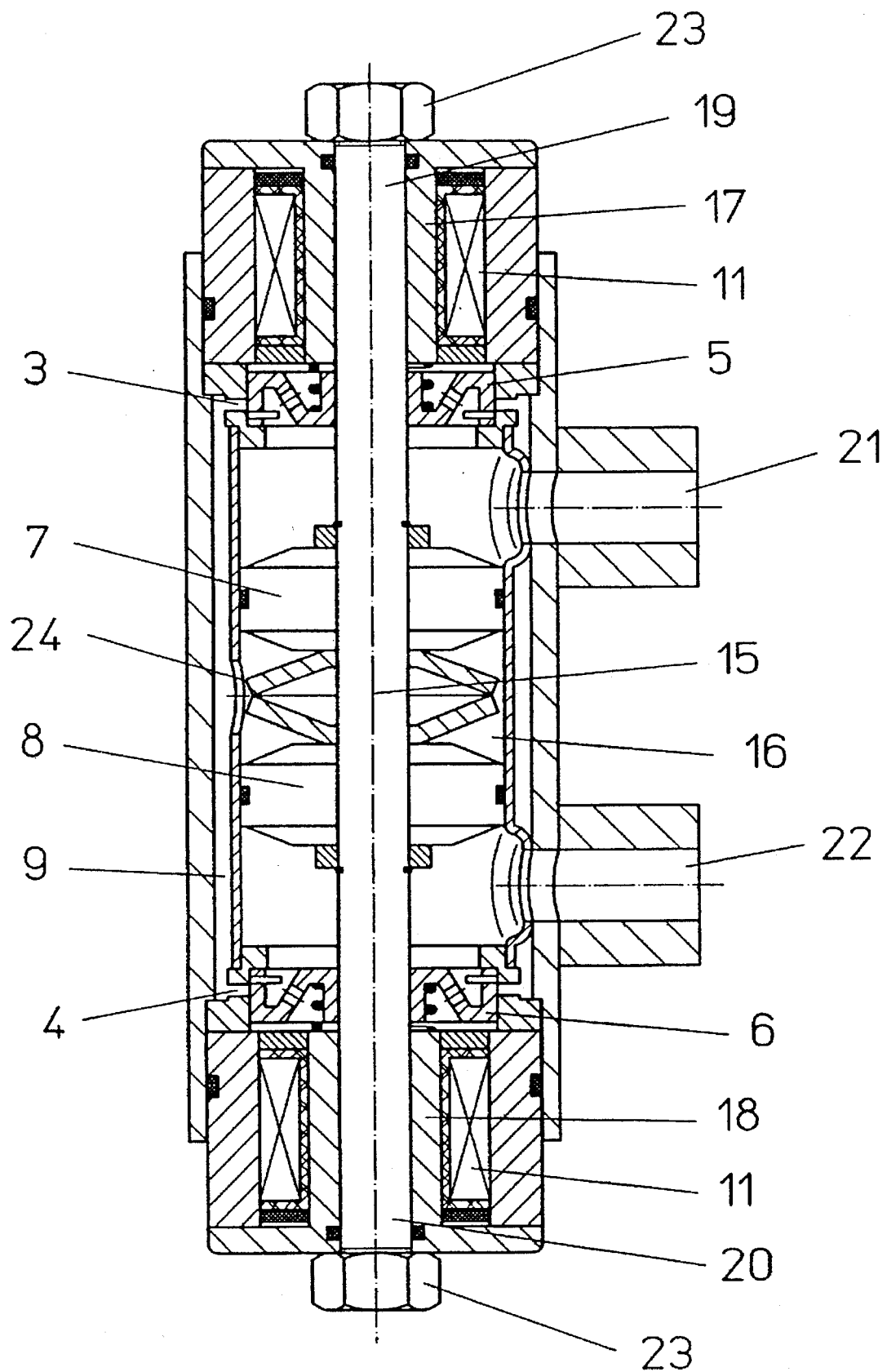

There is a bore through the center of the pole cores 17 and 18 in the electromagnets 11 in the valve system illustrated in FIG. 2. The ends 19 and 20 of the component 15 that pressure-sensitive valves 7 and 8 rest on extend through the bore and are secured to electromagnets 11 by an exterior nut.

The hydraulic-fluid connections 21 and 22 in this embodiment extend into interior 16 and communicate directly with each pressure-sensitive valve 7 and 8 and with the associated port 3 and 4 in bolt 5 and 6 respectively. Bolts 5 and 6 and pressure-sensitive valves 7 and 8 are streamed parallel by way of a port 24 between interior 16 and the hydraulic-fluid channel 9 between ports 3 and 4.

We claim:

1. A regulatable shock-absorption valve system for a dashpot in a motor vehicle, comprising: two shock-absorption valves each having an electromagnetic bolt sliding back and forth; a substantially cylindrical housing having a mutually coaxial suction stage and a compression stage; a pressure-sensitive valve for said suction stage and a pressure-sensitive valve for said compression stage and having at least one port operating in conjunction with said electromagnetic bolt; hydraulic-fluid channels communicating with said suction stage and said compression stage; an electromagnet for actuating said bolt and having a pole core with a center; means for holding said pressure-sensitive valves and having ends secured in a bore extending through said center; said pressure-sensitive valves having mounting means, said bolts being uninfluenced by said mounting means due to introduction of flow forces into said housing over said holding means, said housing holding also fixedly said bolts and associated pole cores, jamming of said bolts being prevented by inhibiting axial forces from acting on said housing, said center simplifying assembly of said shock-absorption valve system.

2. A system as defined in claim 1 wherein said ends of said holding means screw into said pole cores.

3. A system as defined in claim 1, wherein said ends of said holding means extend through said bore and through said center of the pole cores are screwed tight.

4. A system as defined in claim 1, wherein said bolts are annular and surround said holding means.

5. A system as defined in claim 1, wherein said housing is of non-magnetic material.

6. A system as defined in claim 1, wherein said ends of said holding means are secured permanently.

7. A system as defined in claim 1, wherein said ends of said holding means are secured temporarily.

8. A regulatable shock-absorption valve system for a dashpot in a motor vehicle, comprising: two shock-absorption valves each having an electromagnetic bolt sliding back and forth; a substantially cylindrical housing having a mutually coaxial suction stage and a compression stage; a pressure-sensitive valve for said suction stage and a pressure-sensitive valve for said compression stage and having at least one port operating in conjunction with said electromagnetic bolt; hydraulic-fluid channels communicating with said suction stage and said compression stage; an electromagnet for actuating said bolt and having a pole core with a center; means for holding said pressure-sensitive valves and having ends secured in a bore extending through said center; said pressure-sensitive valves having mounting means, said bolts being uninfluenced by said mounting means due to introduction of flow forces into said housing over said holding means, said housing holding also fixedly said bolts and associated pole cores, jamming of said bolts being prevented by inhibiting axial forces from acting on said housing, said center simplifying assembly of said shock-absorption valve system; said ends of said holding means screwing into said pole cores; said ends of said holding means extending through said bore and through said center of the pole cores and being screwed tight; said bolts being annular and surrounding said holding means; said housing being of non-magnetic material; said ends of said holding means being secured permanently.

* * * * *